United States Patent
Paradis et al.

(10) Patent No.: US 12,012,033 B2
(45) Date of Patent: Jun. 18, 2024

(54) SYSTEMS AND METHODS FOR IMPROVING BACKUP LIGHTING VISIBILITY

(71) Applicant: Toyota Motor Engineering & Manufacturing North America, Inc., Plano, TX (US)

(72) Inventors: Alexander L Paradis, Ann Arbor, MI (US); Frank A. Richards, Ann Arbor, MI (US); David N Osborne, Saline, MI (US); Stuart R Wuerthele, Saline, MI (US); John P. Jaaska, Plymouth, MI (US); Clinton Williams, Victoria (AU)

(73) Assignees: Toyota Motor Engineering & Manufacturing North America, Inc., Plano, TX (US); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 17/827,303

(22) Filed: May 27, 2022

(65) Prior Publication Data
US 2023/0382294 A1    Nov. 30, 2023

(51) Int. Cl.
*B60Q 1/22* (2006.01)
*B60Q 1/26* (2006.01)

(52) U.S. Cl.
CPC ............. *B60Q 1/22* (2013.01); *B60Q 1/2696* (2013.01)

(58) Field of Classification Search
CPC ............................... B60Q 1/22; B60Q 1/2696
See application file for complete search history.

(56) References Cited

U.S. PATENT DOCUMENTS

| | | | |
|---|---|---|---|
| 7,153,013 B2 | 12/2006 | Pederson | |
| 2008/0001061 A1* | 1/2008 | Glassner | H05B 45/375 250/206 |
| 2008/0055065 A1 | 3/2008 | Feldmeier | |
| 2016/0257243 A1* | 9/2016 | Son | B60Q 1/50 |
| 2017/0106784 A1* | 4/2017 | Gondhi | B60Q 1/247 |
| 2017/0217361 A1* | 8/2017 | Miller | H05B 47/11 |
| 2020/0164814 A1* | 5/2020 | Solar | B60R 1/06 |
| 2023/0073997 A1* | 3/2023 | Xu | H05B 45/12 |

FOREIGN PATENT DOCUMENTS

| | | |
|---|---|---|
| DE | 102008008868 B4 | 9/2010 |
| KR | 200329126 Y1 | 10/2003 |
| KR | 20080004909 U | 10/2008 |
| KR | 101411206 B1 | 6/2014 |

* cited by examiner

*Primary Examiner* — Mohamed Barakat
(74) *Attorney, Agent, or Firm* — SNELL & WILMER LLP

(57) ABSTRACT

Backup light systems and methods for use in a vehicle. The system includes a backup light configured to generate light in an illumination pattern, a sensor configured to detect data corresponding to a vehicle condition, and an electronic control unit (ECU) coupled to the backup light and the sensor. The ECU is configured to determine the vehicle condition based on the detected data, and adjust an intensity of the light generated by the backup light based on the vehicle condition.

15 Claims, 4 Drawing Sheets

SYSTEMS AND METHODS FOR IMPROVING BACKUP LIGHTING VISIBILITY

BACKGROUND

1. Field

The present disclosure relates to systems and methods for improving vehicle lighting in various circumstances and, more particularly, for improved visibility of vehicle light sources in a reverse state.

2. Description of the Related Art

Lights are and have been an integral component of vehicles for some time. Vehicle lights include headlights to illuminate an area around the vehicle in dark conditions, taillights to inform following vehicles of the presence of the present vehicle, and backup, or reverse, lights to illuminate the rear areas of the vehicle when the vehicle is in reverse. The vehicles may further include a number of cabin lights including central cabin lights to illuminate some or all of the vehicles' cabin as well as backlights to illuminate specific vehicle features (such as instrument panels).

Additionally, the backup lights are configured to illuminate to a regulated intensity under reverse conditions to alert the surroundings to its intention to back-up. Backup lighting of a vehicle is a regulated (e.g., FMVSS 108 standard) and mandatory function for all vehicles in the United States. For instance, the backup light is required to be "steady burning," or a continuous lamp. Typically, incandescent bulbs are used for this function. However, incandescent bulbs can take upwards of 300 milliseconds (ms) to reach the full intensity and a "steady burning" state.

Thus, there is a need in the art for improved backup lighting systems and methods for vehicles.

SUMMARY

Described herein is a system for a backup light system for use in a vehicle. The system includes a backup light configured to generate light in an illumination pattern, a sensor configured to detect data corresponding to a vehicle condition, and an electronic control unit (ECU) coupled to the backup light and the sensor. The ECU is configured to determine the vehicle condition based on the detected data, and adjust an intensity of the light generated by the backup light based on the vehicle condition.

Also disclosed herein is a method of operating a backup light system for use in a vehicle. The method includes generating light in an illumination pattern, detecting data corresponding to a vehicle condition, determining the vehicle condition based on the detected data, and adjusting an intensity of the light generated by a backup light based on the vehicle condition.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing an improved backup lighting system. These systems provide various benefits and advantages such as increasing awareness to surrounding environment and people (e.g., pedestrians, cyclists, vehicles, etc.) by changes in brightness of the lighting to indicate the vehicle is in reverse. Changing the brightness of the lighting (e.g., increasing the brightness, flashing the backup lights, adding or changing a color, etc.) may happen at the beginning of the backup lamp activation, as will be explained further herein. This advantageously draws more attention to the intended backup and increases overall safety.

For an incandescent bulb to become "steady burning," it takes approximately 300 ms or maybe even longer. However, for a light-emitting diode (LED) to become "steady burning," it's nearly instantaneous as it can take only about 20 ms or maybe even less time. Accordingly, it can be considered that an LED can provide a remainder of 280 ms or more to increase the lighting and visibility to the customer and differ from the "steady burning" requirement of the regulation. As such, a series of flashes (e.g., 2× or 3× intensity) to increase the visibility of the backup light function during the 280 ms of time gained by using an LED function.

An exemplary system includes a backup light system that includes a lamp unit having an LED light source and an electronic control unit coupled to the LED light source and configured to control an intensity, timing, duration and/or brightness of the LED light source. Upon receipt of an activation signal, the electronic control unit controls the LED light source to illuminate to the regulated "steady burning" intensity. Upon reaching the "steady burning" intensity, the electronic control unit controls the LED light source to flash between a higher intensity and the regulated "steady burning" intensity at a predetermined interval only until a lapse of a predetermined duration that is less than or equal to the time it takes an incandescent bulb to reach a "steady burning" state. During the variation of intensity, the higher intensity has an intensity that is higher than the regulated "steady burning" intensity, and the intensity of the LED does not go below the "steady burning" intensity. Upon lapse of the predetermined duration, the LED light source returns to the "steady burning" intensity.

Figure 1A:
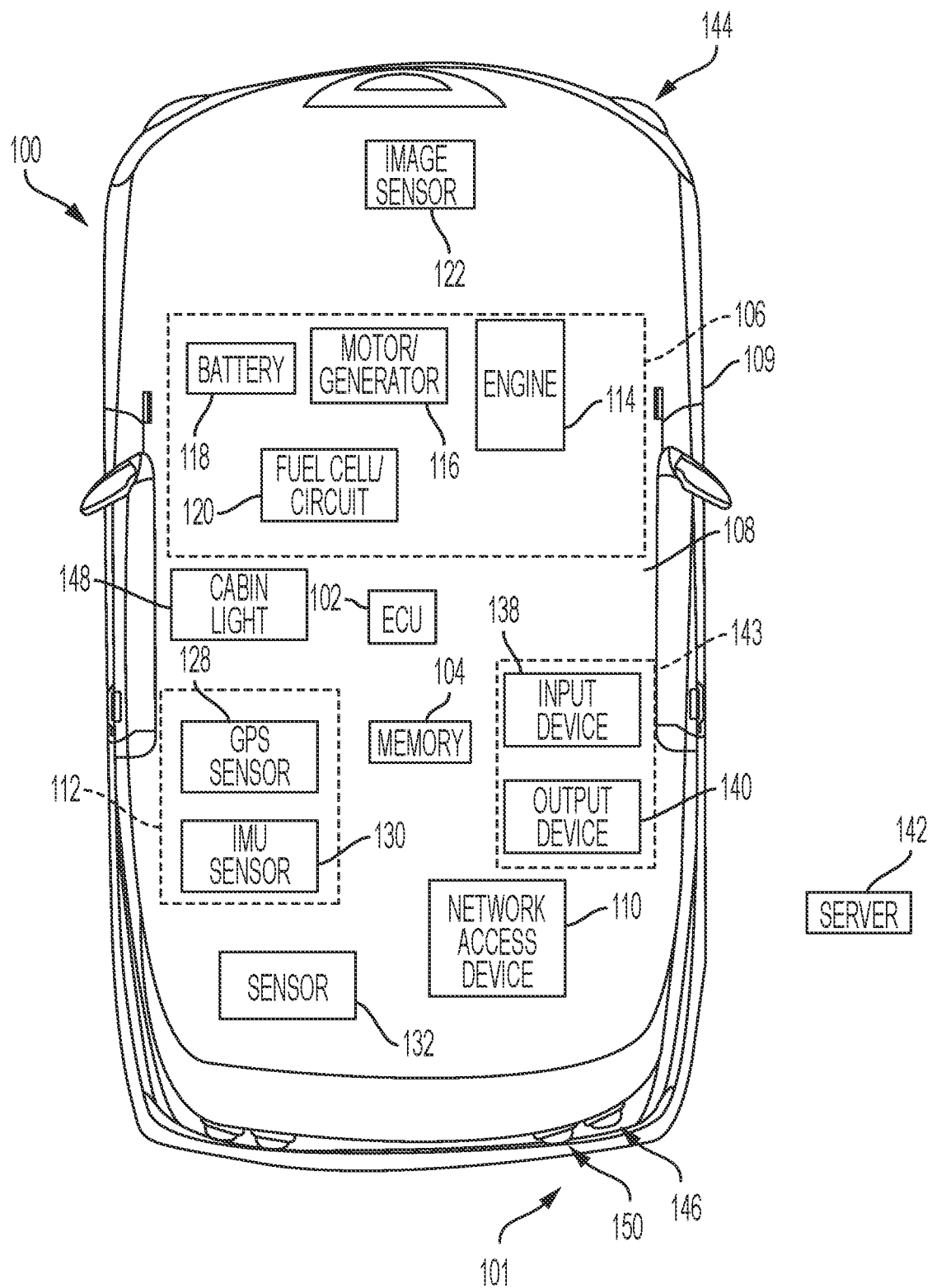
FIG. 1A is a block diagram illustrating a system and a vehicle for improved backup lighting according to an embodiment of the present invention.

Turning to FIG. 1, a vehicle 100 may include a backup light system 101 for providing adaptive vehicle lights based on environmental conditions and other factors. The backup light system 101 may include an ECU 102, a memory 104, a power source 106, and a main body 109. The vehicle 100

(or backup light system 101) may further include a network access device 110, headlights 144, taillights 146, one or more cabin light 148, and a backup light 150 (e.g., a lamp unit). In various embodiments, the taillights 146 and backup lights 150 are an integrated system (e.g., a "rear combination lamp"). The vehicle 100 may further include a location sensor 112, an image sensor 122, and a sensor 132. The vehicle 100 may also include a multimedia unit 143 including an input device 138 and an output device 140.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individuals such as a driver, a passenger, or the like.

The main body 109 may define a vehicle cabin 108. The cabin light 148 may be located in the vehicle cabin 108 and may illuminate a portion of the vehicle cabin 108. For example, the cabin light 148 may illuminate the vehicle cabin 108 generally, or may illuminate a specific element (such as a display or an instrument panel) within the vehicle cabin 108.

Figure 1B:
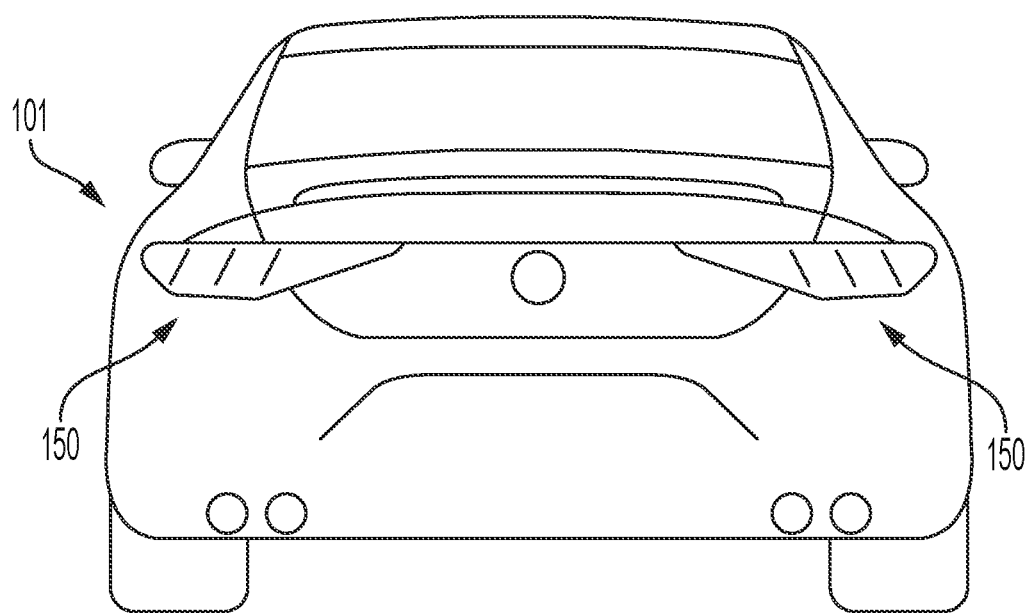
FIG. 1B is a rear view illustrating the system and the vehicle of FIG. 1 for improved backup lighting according to an embodiment of the present invention.

The headlights 144 may be located at or near a front end of the main body 109 and may illuminate an area in a forward direction relative to the main body 109. The taillights 146 may be located at or near a rear end of the main body 109 and may generate light to increase visibility to the driver and/or of the main body 109 during low-light conditions. The backup lights 150 may additionally be located at or near a rear end of the main body 109 and may generate light to increase visibility behind and/or of the main body 109 during reverse conditions. As shown in FIG. 1B, the backup lights 150 may include one or more LEDs. For instance, the backup lights 150 may include three LED lights on the driver side and three LED lights on the passenger side.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality.

The memory 104 may include any non-transitory memory and may store data usable by the ECU 102. For example, the memory 104 may store map data, may store instructions usable by the ECU 102 to drive autonomously, may store data indicating actions to be taken by the ECU during various environmental conditions, or the like. The memory 104 may store the timing data for when the LED becomes "steady burning" and how the LED is going to function thereafter and for how long. For example, the memory 104 may store the timing data including that the LED is going to operate in an increased intensity state (e.g., 2× or 3× intensity) and/or flashing state (e.g., flashing every 10 ms or 20 ms) before and/or after the "steady burning" time and for a time period T (e.g., 280 ms). The ECU 102 may retrieve the timing data and control the backup lights 150 based on the timing data.

The power source 106 may include any one or more of an engine 114, a motor-generator 116, a battery 118, and/or a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage devices including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 108 and may detect image data corresponding to an environment of the vehicle 100. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109. For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

The sensor 132 may include one or more of a sensor capable of detecting a status of a vehicle component, a sensor capable of detecting environmental conditions (including weather), a voltage sensor, a current sensor, a temperature sensor, a pressure sensor, a fuel gauge, an airflow sensor, an oxygen sensor, or the like. For instance, the sensor 132 is configured to detect when a driver or a vehicle engages a reverse setting or in a reverse direction.

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device associated with a vehicle user. In that regard, the vehicle user may adjust vehicle settings using the remote device.

The output device 140 may include any output device such as a speaker, a display, a touchscreen, or the like. In some embodiments and as further described below, the output device 140 may include a display overlaid on a vehicle window. The output device 140 may output data to a user of the vehicle such as a warning of a suspicious event. The network access device 110 may likewise be considered an output device as it may transmit output data to the remote device, where it may be output to a vehicle user.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may be referred to as a data communication module (DCM) and may communicate with any device on the vehicle 100 and/or any remote device. For example, the network access device 110 may communicate with at least one of a remote server 142 (such as a cloud server or other central server) or a remote device (such as a mobile telephone, a laptop, a tablet, a desktop computer, a PDA, or the like).

The network access device 110 may receive various information from the remote server 142 usable to control the various lights (e.g., the headlights 144, the taillights 146, the cabin light 148, and the backup lights 150). For example, the network access device 110 may receive weather information (e.g., sunrise and sunset times, moonrise and moonset times, the presence of rain, fog, smog, or the like). The network access device 110 may further receive ambient light information (such as the location and brightness of streetlights and other artificial light) from the remote server 142.

The ECU 102 may control the operation of the vehicle lights (e.g., the headlights 144, the taillights 146, the cabin light 148, and the backup lights 150) based on the data detected by the various sensors (e.g., the location sensor 112, the image sensor 122, and the sensor 132) and data received by the network access device 110. For example, the ECU 102 may determine that the driver has engaged a reverse gear or operation (e.g., based on data detected by the sensor 132). In other words, the ECU 102 receives an activation signal. The ECU 102 may activate the backup lights 150 based on this information to change or increase illumination of the backup lights 150.

The ECU 102 may control the brightness, flashing, intensity, orientation, timing, and/or electrical properties of the backup lights 250 to alert, notify or illuminate any following person or vehicle to the presence of the main body 109. For example, the ECU 102 may control the backup lights 150 to activate an illumination pattern. Specifically, upon receipt of the activation signal, the ECU 102 controls the backup lights 150 (e.g., the LED light source) to illuminate to a predetermined intensity I1 (e.g., a FMVSS 108 regulated "steady burning" intensity). Upon reaching the predetermined intensity, or the "steady burning" intensity, the ECU 102 controls the backup lights 150 (e.g., the LED light source) to flash between a second intensity I2 and the predetermined intensity I1 at a predetermined interval throughout a predetermined duration (e.g., a predetermined period of time). For example, the predetermined duration can be between about 20 ms and 500 ms and preferably between about 200 ms and 300 ms. In various embodiments, the predetermined duration is about 280 ms. The predetermined duration may be defined as equal to the time it takes an incandescent bulb to reach the "steady burning" intensity. The second or higher intensity I2 is higher than the predetermined or initial intensity I1. For example, the second intensity I2 may be 2×, 5×, and/or 10× the predetermined or initial intensity I1. In various embodiments, the ECU 102 controls the backup lights 150 (e.g., the LED light source) to flash between a third intensity I3 and the predetermined intensity I1, and/or between the third intensity I3 and the second intensity I2, at the predetermined interval throughout the predetermined duration. The third intensity I3 may be 2×, 5×, and/or 10×. The third intensity I3 may be higher than the second intensity I2.

The illumination pattern during the predetermined duration may include a variation of light intensity, wherein the higher intensity has a light intensity that is higher than the predetermined intensity, and the intensity of the LED does not go below the predetermined intensity. These peaks of intensity may be perceived as flashes of light. In various embodiments, each flash may be the same or a different intensity. The illumination pattern (e.g., the LED flashes) may function between the higher intensity and the predetermined intensity at the predetermined interval. For instance, the illumination pattern may include two flashes approximately 100 ms apart or multiple flashes 25 ms apart. In various embodiments, the illumination pattern may include three to five flashes approximately 50 ms apart. The illumination pattern may include any number of flashes at various interval as suitable for improved backup light visibility. The illumination pattern may also be a constant higher intensity (e.g., the second intensity I2 or the third intensity I3) for the entire predetermined duration or interval (e.g., between T0 and T2 or between T1 and T2). Upon lapse of the predetermined duration, the LED light source returns to the predetermined intensity I1.

Figure 2:
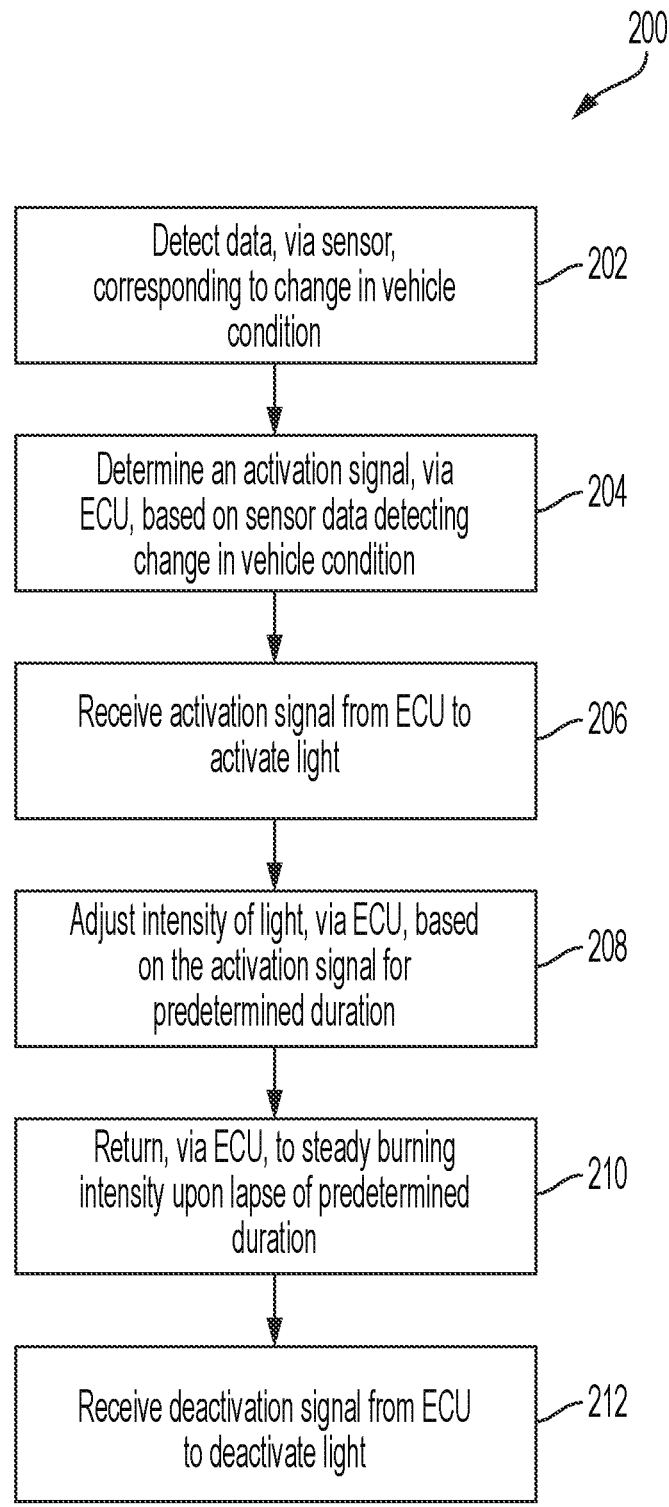
FIG. 2 is a flowchart illustrating a method for improved backup lighting according to an embodiment of the present invention.
Figure 3:
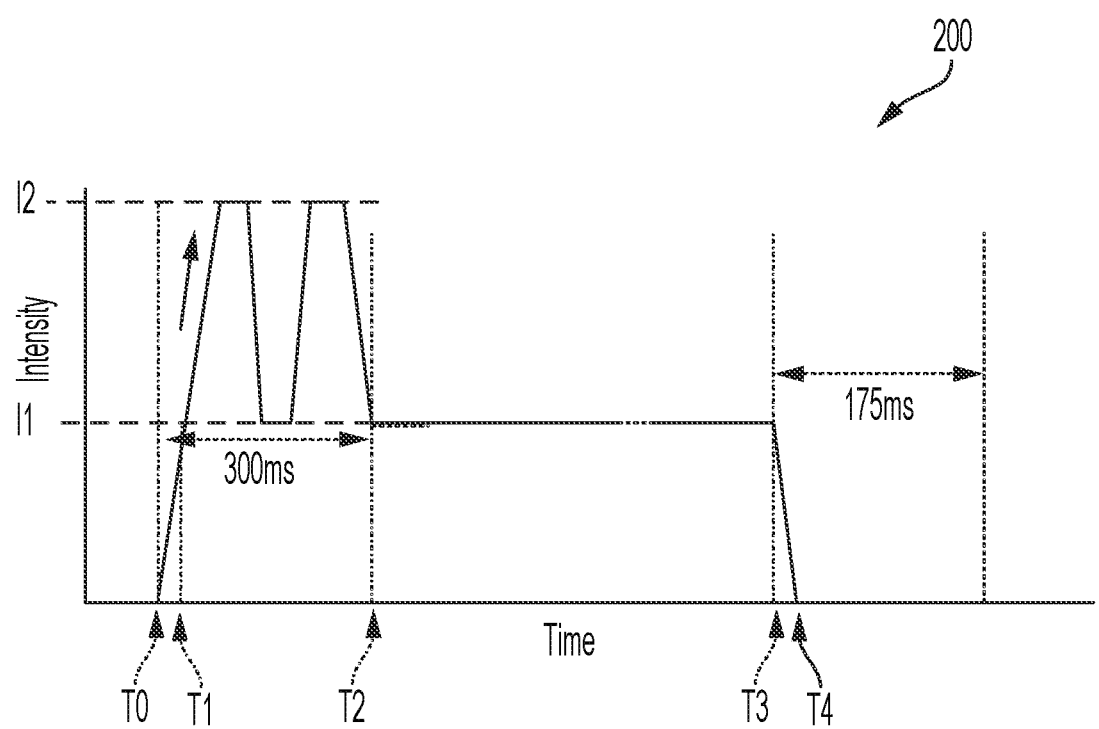
FIG. 3 is a graph illustrating an exemplary implementation of the method of FIG. 2 according to an embodiment of the present invention.

Referring now to FIGS. 2 and 3, a method 200 for controlling backup lights of a vehicle is illustrated. The method 200 may be performed by components of a vehicle similar to the vehicle 100 of FIG. 1. The method 200 may begin at step 202, where one or more sensor of the vehicle may detect data corresponding to a change in vehicle condition. For example, a sensor may detect a driver engages a reverse gear or operation.

At step 204, an ECU of the vehicle may determine an activation signal based on the sensor detecting the reverse gear engagement. As yet another example, the ECU may determine the presence, relative location, and heading of another vehicle based on data detected by an image sensor.

At step 206, one or more light source of the vehicle may generate light at T0. The light source may include headlights, taillights, cabin lights, a backup light, or the like. For instance, the backup light is activated and begins to illuminate at T0. At T1, the backup light may be illuminated to the predetermined intensity I1. The duration between T0 and T1 (e.g., a startup duration) may be approximately 20 ms, wherein the backup light is illuminated to a regulated "stead burning" intensity.

At step 208, the ECU may adjust an intensity, an orientation, or other characteristic of the generated light based on the activation signal. For example, when the activation signal is received from a sensor, the ECU can determine that the driver desired the vehicle to drive in reverse. In that regard, the ECU may control the characteristics of the backup light to improve visibility and alert, notify, and/or illuminate the surroundings of the vehicle. The ECU may take such actions as to trigger an illumination pattern during a predetermined duration (e.g., between T1 and T2). Over the course of the predetermined duration (e.g., the 280 ms following the 20 ms it took for the backup light to initially achieve the predetermined intensity I1 during the startup duration), the ECU may control the backup light to perform the illumination pattern, which may include a variation of intensity or a constant higher intensity. The illumination pattern may include peaks of intensity which may be perceived as flashes of light or a constant brighter or greater intensity light. The illumination pattern (e.g., the LED flashes) may function between the predetermined intensity I1 and the higher intensity I2 at a predetermined interval. For instance, the illumination pattern may include two to three flashes approximately 100 ms apart. In various embodiments, the illumination pattern may include three to five flashes approximately 50 ms apart. In various embodiments, the intensity of each peak may increase between 2×, 5×, and/or 10×, for example. In other words, I2 is equal to 2×I1, 5×I1, etc. In various embodiments, each flash may be a different intensity. The illumination pattern (e.g., the LED flashes) may function between the predetermined intensity I1 and the higher intensity I2 at a predetermined interval, and between the predetermined intensity I1 and the highest intensity I3 at the following predetermined internal. For example, the first flash may be 2×, the second flash may be 5×, the third flash may be 10×, and the fourth flash may be 10×.

At step 210, upon lapse of the predetermined duration, the backup light may return to the predetermined intensity I1 at T2 and remain at I1 through the duration of the reverse operation of the vehicle (e.g., a reverse duration between T2 and T3). At step 212, a deactivation signal may be received at T3 by the ECU and/or the backup light such that the backup light is turned off throughout a power-off duration between T3 and T4. For instance, the driver completed their reverse operation and engages the vehicle in a neutral gear or operation or a forward gear or operation. The backup light may be deactivated within 20 ms (e.g., the power-off duration, T3 to T4) after the reverse duration.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A backup light system for use in a vehicle, the system comprising:
   a backup light configured to generate light;
   a sensor configured to detect data corresponding to a vehicle condition; and
   an electronic control unit (ECU) coupled to the backup light and the sensor, and configured to:
      determine the vehicle condition based on the detected data;
      activate the backup light to
      generate the light in an illumination pattern over a predetermined time duration that is less than or equal to a time it takes an incandescent bulb to reach a steady burning state based on the vehicle condition, the illumination pattern including:
         two or more periods of light at a first intensity, and
         at least one period of light at a predetermined intensity that is lower than the first intensity between the two or more periods of light at the first intensity to increase awareness of the vehicle to a surrounding environment, and
      control the backup light to generate the light at the predetermined intensity upon lapse of the predetermined time duration for the remainder of the vehicle condition.

2. The backup light system of claim 1, wherein the vehicle condition is at least one of a reverse gear or a reverse operation.

3. The backup light system of claim 1, wherein the backup light is an LED light source.

4. The backup light system of claim 1, wherein the predetermined time duration is between 20 ms-500 ms.

5. The backup light system of claim 1, wherein the two or more periods of light at the first intensity and the at least one period of light at the predetermined intensity occur over the predetermined time duration at a predetermined time interval.

6. The backup light system of claim 5, wherein the predetermined time interval includes two intervals approximately 100 ms apart.

7. The backup light system of claim 1, wherein the first intensity is 2× the predetermined intensity.

8. The backup light system of claim 1, wherein the backup light is configured to generate the light in the illumination pattern to increase awareness of the vehicle to at least one of a pedestrian, a cyclist, or a second vehicle.

9. A method of operating a backup light system for use in a vehicle, the method comprising:
   detecting data corresponding to a vehicle condition;
   determining the vehicle condition based on the detected data;
   activating a backup light to
   illuminate the backup light in an illumination pattern over a predetermined time duration that is less than or equal to a time it takes an incandescent bulb to reach a steady burning state, the illumination pattern including:
      two or more periods of light at a first intensity, and
      at least one period of light at a predetermined intensity that is lower than the first intensity between the two or more periods of light at the first intensity to increase awareness of the vehicle to a surrounding environment.

10. The method of claim 9, further comprising receiving a deactivation signal such that the backup light is turned off.

11. The method of claim 9, wherein the backup light is an LED light source.

12. The method of claim 9, further comprising retaining the light at the predetermined intensity after lapse of the predetermined time duration for the remainder of the vehicle condition.

13. The method of claim 9, wherein the illumination pattern comprises flashing occurring over the predetermined time duration at a predetermined time interval.

14. The method of claim 9, wherein the illumination pattern comprises various intensities occurring over the predetermined time duration at a predetermined time interval.

15. The method of claim 9, wherein the vehicle condition is at least one of a reverse gear or a reverse operation.

\* \* \* \* \*